United States Patent [19]

Bailey

[11] Patent Number: 4,726,485
[45] Date of Patent: Feb. 23, 1988

[54] COLLAPSIBLE RECEPTACLE FOR HAND DOLLY

[76] Inventor: Dallas Bailey, 8100 SW. 37 Ter., Miami, Fla. 33155

[21] Appl. No.: 7,512

[22] Filed: Jan. 28, 1987

[51] Int. Cl.⁴ .............................................. B65D 6/00
[52] U.S. Cl. .......................................... 220/6; 220/4 F
[58] Field of Search ........................ 220/6, 7, 4 F, 345

[56] References Cited

U.S. PATENT DOCUMENTS

| | | | |
|---|---|---|---|
| 2,513,526 | 7/1950 | Simonian | 220/6 X |
| 2,811,275 | 10/1957 | Draper | 220/7 |
| 2,891,802 | 6/1959 | Moran | 220/6 X |
| 4,221,302 | 9/1980 | Kupersmit | 220/4 F |
| 4,512,477 | 4/1985 | Densen | 220/4 F X |
| 4,624,380 | 11/1986 | Wernette | 220/6 |

Primary Examiner—Steven M. Pollard
Attorney, Agent, or Firm—John Cyril Malloy

[57] ABSTRACT

The collapsible receptacle includes a three sided outer body that is formed of three sections that are hinged together. A front, rigid panel is inserted via a tongue and groove fit between the opposing edges of the two side sections of the outer body. The panel slides up and down with respect to the outer body. A rigid base serves as the bottom for the receptacle and includes three peripheral grooves that mate with the lower bottom portions of the three sided outer body. The base also includes a front tab extending upward that is closely fitted against the exterior surface of the rigid front panel when the panel is fully inserted. Straps extend from one side section of the outer body, over the vertically upright struts of a hand dolly and are attached to the opposing side section of the body.

4 Claims, 6 Drawing Figures

COLLAPSIBLE RECEPTACLE FOR HAND DOLLY

BACKGROUND OF THE INVENTION

The present invention relates to a receptacle that can be removably mounted onto a hand dolly and particularly relates to a receptacle that is collapsible when not in use.

Several carriers are available for hauling trash and other items such as leaves, tools, wood and other miscellaneous material. One type of carrier is a wheelbarrow. However, wheelbarrows are bulky and difficult to store.

The present invention can be generally considered a substitute for a wheelbarrow or similar carrier of material.

OBJECTS OF THE INVENTION

It is an object of the present invention to provide a collapsible receptacle which is adapted to be mounted on a hand dolly.

It is a further object of the present invention to provide a receptacle which has a movable front panel such that the items in the receptacle can be easily dumped.

It is a further object of the present invention to provide a receptacle which is collapsible such that it forms a substantially flat, rectangular body when not in use.

SUMMARY OF THE INVENTION

The collapsible receptacle includes a three sided outer body that is formed of three sections that are hinged together. A rigid panel is movably mounted between the opposing edges of two side sections of the three sided outer body. The rigid panel forms the front side. With a tongue and groove fit between the panel and the side sections, the panel slides up and down with respect to the three sided outer body. A base serves as the bottom for the receptacle and includes three structures defining peripheral grooves that mate with the lower bottom portions of the three sections of the outer body. The base also includes a front tab extending upward that is closely fitted against the exterior surface of the rigid front panel when the panel is fully inserted. Straps extend from one side section of the three sided outer body, around the vertically upright struts of a hand dolly and are attached to the opposing side section of the three sided body. Additionally, a cross bar can be placed across the open top end of the receptacle such that the opposing sides do not bow out or in. After removal of the front panel, the three sided body can be lifted off of the base, the three sections of the body can be collapsed upon one another to form a flat, rectangular body.

BRIEF DESCRIPTION OF THE DRAWINGS

Further objects and advantages of the present invention can be found in the detailed description thereof when taken in conjunction with the accompanying drawings in which.

DETAILED DESCRIPTION OF THE PREFERRED EMBODIMENT

The present invention relates to a collapsible receptacle that can be mounted on a hand dolly. Similar numerals designate similar items throughout all the figures.

Figure 1:
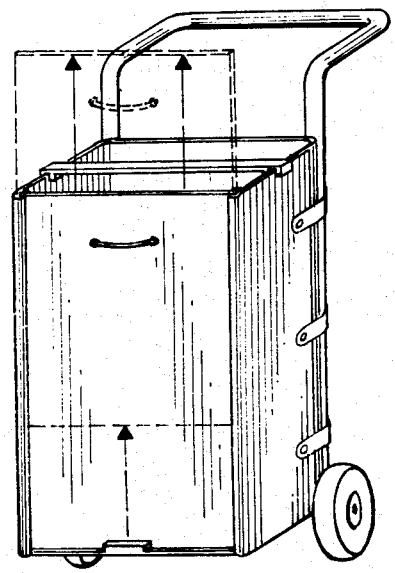
FIG. 1 illustrates a perspective view of the collapsible receptacle mounted on a hand dolly.
Figure 2:
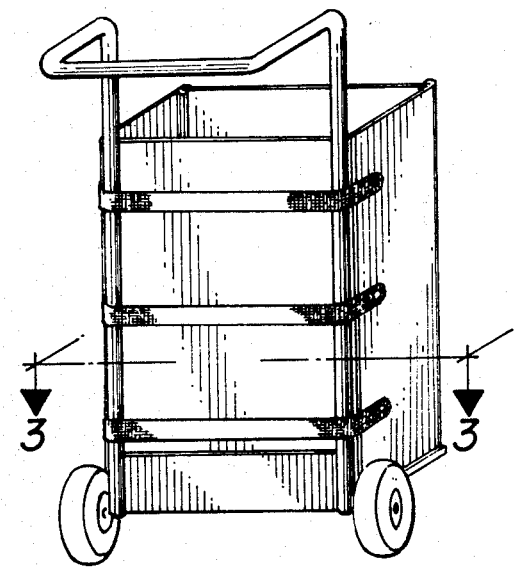
FIG. 2 illustrates a different perspective view of the assembled receptacle.

FIGS. 1 and 2 will be discussed simultaneously. Hand dolly 10 includes handle 12 and vertical struts 14 and 15 that extend down to horizontal cross piece 16. Cross piece 16 provides support for the axle running between wheels 18 and 20. It is commonly recognized that the hand dolly or hand truck includes a horizontally extending ledge or step extending in direction z as shown by coordinate diagram 22 in FIG. 2.

Collapsible receptacle 30, when assembled, sits on this horizontally extending ledge (the ledge is not shown in any of the figures). Collapsible receptacle 30 includes a three sided outer body 32 made up of three sections 34, 36, and 38 that respectively form the left side, back side, and right side of receptacle 30. The left and right is viewed from the perspective of the operator of hand dolly 10. Section 34 is hingedly attached to section 36 by a pair of ridges or grooves providing a "thinned" area generally at the corner of the assembled receptacle, i.e., generally at corner 40. The ridges are best shown at corner 40 in FIG. 3. Back side section 36 is hingedly attached to right side section 38 at corner 42 by the same type of structure.

A rigid front panel 44 is removably mounted across the open end (open during assembly) of receptacle 30. In FIG. 1, rigid front panel 44 is shown as in a lifted position, above receptacle base 46, by dashed lines. This lifting operation facilitates the removal or dumping of the contents of the receptacle without having to turn over the receptacle to empty the contents out of the open top side of the receptacle. A cross bar 48 provides support across that top opening. Cross bar 48 has a pair of locking fingers 50 and 52 that mate with the top upper wall portions of opposing sides 34 and 38 of receptacle 30. FIG. 2 shows cross bar 48 removed such that the receptacle can be loaded. It has been determined that receptacle 30 can hold an excess of 100 pounds of material.

Receptacle 30 is removably mounted on hand dolly 10 by a plurality of straps one of which is strap 60. These straps are removably affixed to opposing sides 34 and 38 and encircle or wrap around vertical struts 14 and 15 of hand dolly 10. In one embodiment, the straps are velcro type material and opposing sides 34 and 38 have a complimentary velcro like material providing a gripping or mounting surface. Other types of mounting mechanisms can be utilized in conjunction with the collapsible receptacle. In one embodiment, receptacle 30 is approximately 30" high (along the Y axis per coordinate designator 22) approximately 13" deeps (Z axis) and approximately 24" wide (X axis).

Figure 3:
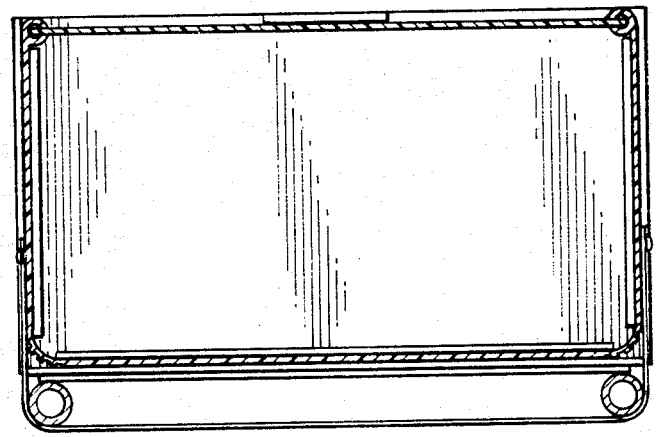
FIG. 3 is a cross-sectional view of the assembled receptacle as viewed from section line 3'-3" in FIG. 2.

FIG. 3 shows a cross-sectional view of the assembled collapsible receptacle as seen from the perspective of section line 3'-3" in FIG. 2. Strap 62 is clearly shown wrapping around struts 14 and 15 of the hand dolly. The upper surface plane 64 of base 46 is visible. Base 46 includes front end tab 66 that extends upward (see FIGS. 1 and 5) and closely fits with the exterior surface of the lower end portion of front panel 44.

Front panel 44 is removably mounted onto opposing sides 34 and 38 by a tongue and groove structures extending along the opposing edges of those opposing sides. Left side section 34 includes groove 70 along its vertical edge into which fits left edge of front panel 44. Right side section 38 includes groove 72 into which fits a right edge of front panel 44. Front panel 44 can be removably mounted onto side sections 34 and 38 by other mechanisms.

Figure 4:
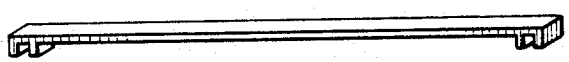
FIG. 4 is a perspective view of the cross bar.

FIG. 4 shows cross bar 48 and provides a detailed view of locking finger set 52, that includes downwardly extending fingers 74 and 76, as well as locking finger set 50 that includes fingers 78 and 80. The groove between fingers 74 and 76 closely matches the thickness of the side wall section. The groove between fingers 78 and 80 is similarly fit to the side wall.

Figure 5:
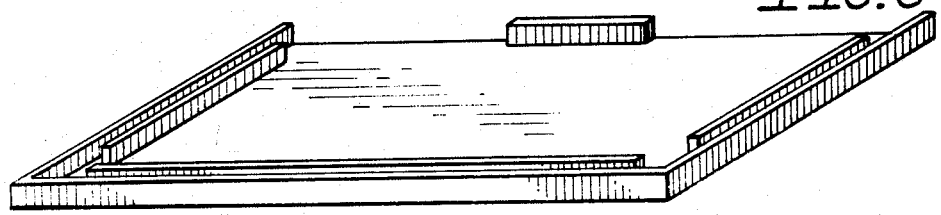
FIG. 5 is a perspective view of the base of the receptacle.

FIG. 5 shows a perspective view of base 46 showing bottom surface 64 of the receptacle. Upwardly extending front end tab 66 is clearly shown. Around the periphery of base 46 is a retaining means which forms, in this embodiment, a set of three grooves 82, 84, and 86. The bottom edge portions of side sections 34, 36, and 38 respectively fit into grooves 82, 84, and 86. Base 46 is rigid as is front panel 44 and cross bar 48.

Figure 6:
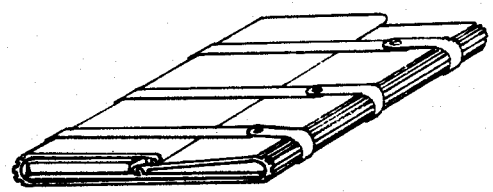
FIG. 6 is a perspective view of the collapsed receptacle that forms a flat, rectangular body.

FIG. 6 shows the collapsed form of the receptacle. Left and right side sections 34 and 38 collapse onto back side section 36 and the straps, one of which is strap 60, wrap around the collapsed, substantially flat, rectangular body to make a compact structure. Strap 60, as well as the other straps, include a self-attachment mechanism at location 90. Velcro type fasteners could be used at that location. FIG. 6 clearly shows longitudinally extending riges 92 and 94 hingedly connecting side 38 to side 36 and side 34 to side 36. These grooves can be slots or "thin" portions of the collapsible outer body structure of the receptacle. In one embodiment, the thickness of the substantially flat, rectangular body of the collapsed outer body is approximately 3". The entire receptacle may be made out of plastic such that it is easily manufactured, maintained, and cleaned by the owner. The height of tab 66 attached to base 46 and the height of grooves 82, 84, and 86 is approximately 0.5".

The claims appended hereto are meant to cover modifications and changes within the scope and spirit of the invention. For example, the collapsible three sided outer body of the receptacle need not have its front side open, but may have an open side section such that the rigid panel is removable between the front side and the back side sections. Many types of fasteners and mounters could be used in place of strap 60.

What I claim is:

1. A collapsible receptacle adapted to be mounted on a hand dolly which includes vertical struts and a support platform, said receptacle comprising:

a one-piece collapsible, three sided outer body having three planar sections, a back section and a pair of side sections, each side section being hingedly connected to the back section such that said side sections can be hingedly opened to an open position to form said three sided outer body when the plane of the side sections are in parallel relation to one another and perpendicularly oriented with respect to the plane of the back section and, alternatively, be collapsed for compact storage with the side sections and back section in generally parallel planes forming a substantially flat rectangular body;

each side section having an outer swingable edge, and each of said swingable edges having a groove therealong, said grooves confronting one another and being of a predetermined uniform width;

a rigid panel removably mountable in the grooves and across the opening of said three sided outer body when in the open position, said rigid panel being sized for sliding receipt in the side section grooves;

a base forming a bottom of the receptacle and having means for retaining said three sided outer body and said rigid panel in said open position;

means for mounting said receptacle to the dolly and on the platform comprising a flexible strap, said strap having opposite ends and mutually interengageable means on each of the strap ends and on each of the side sections, said strap being of a sufficient length to tightly hold the back section against the dolly when the receptacle is in the open position and on the dolly and the strap ends are interengaged with the side sections with said strap encircling the vertical struts extending upward on said hand dolly, and also being long enough to encircle said rectangular body when the body is collapsed for storage.

2. A receptacle as claimed in claim 1 wherein said means for retaining form three base grooves into which fit three bottom wall portions of said three sided outer wall.

3. A receptacle as claimed in claim 1 wherein said three sided outer body includes two opposing grooves along a pair of opposing outer edges thereof, said grooves sized to closely fit about two opposing edges of said rigid panel when said rigid panel is mounted across said opening of said three sided outer body and wherein said means for retaining form three base grooves into which fit three bottom wall portions of said three sided outer wall, and said means for retaining includes a front side tab extending from the upper surface plane of said base and disposed to closely fit against the exterior front surface of said panel proximate said base.

4. A receptacle as claimed in claim 1 including a cross bar having a pair of locking fingers adapted to respectively lock onto respective top upper wall portions of two opposing sides of said three sided outer body, said cross bar extending across the open top of the assembled receptacle.

* * * * *